Aug. 13, 1935. J. H. TAIT ET AL 2,011,127
HANGER
Filed May 5, 1934
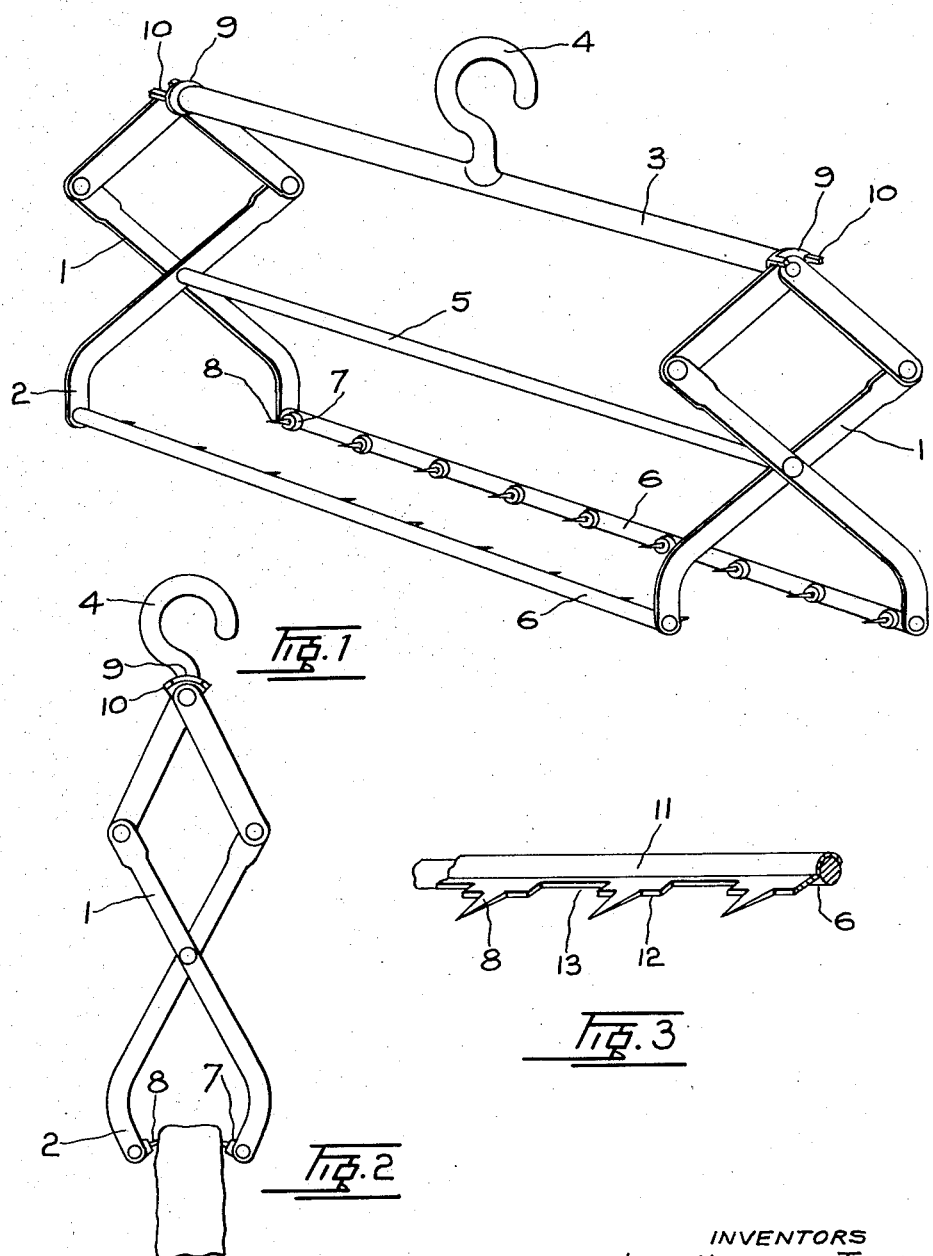

Patented Aug. 13, 1935

2,011,127

UNITED STATES PATENT OFFICE 2,011,127

HANGER

John Herbert Tait and Hugh William MacLeod, Victoria, British Columbia, Canada

Application May 5, 1934, Serial No. 724,200

1 Claim. (Cl. 17—44)

Our invention relates to improvements in hangers which are particularly adapted for use in hanging meats, bacon and fish in retail stores, warehouses and smoke houses. The hangers now in common use are generally made of relatively heavy gauge wire and consist of a plurality of spaced hooks, which are driven through the product from one side to support it. In view of the force required to thrust the several hooks through the meat, a relatively heavy gauge wire is required to withstand the strains imposed upon them. Taking as an example a side of bacon, the hooks above referred to are thrust in at approximately one inch from the end of the piece and after smoking, the whole of that portion of the piece is discoloured around the holes made by the hooks and is rendered unfit for sale and unfit for cooking and consumption.

The object of the present invention is to provide means whereby a piece of meat or other foodstuff can be supported without damaging the product; to provide means whereby no appreciable effort is required to secure the meat to the hanger and to provide a minimum surface contact between the parts of the hanger and the meat gripped, whereby when smoking said meat the smoke can make proper contact therewith, so that no unsmoked or unsatisfactorily treated portions are left. A further object is to provide means whereby the meat is but lightly pierced so that no discoloration or damage will result, and a still further object is to provide means whereby no appreciable effort is required to attach the hanger to a product or remove it therefrom.

The invention consists of a pair of spaced lazy tongs supporting at their free ends a pair of bars provided with inwardly directed pins adapted to engage opposite sides of the product to be carried, as will be more fully described in the following specification and shown in the accompanying drawing, in which:—

Fig. 1 is a perspective view of the invention.

Fig. 2 is an end view of same showing a side of bacon supported thereby.

Fig. 3 is a detail view showing a modification of the prong structure.

In the drawing like characters of reference indicate corresponding parts in each figure.

The numeral 1 indicates pairs of lazy tongs terminating at the base with legs 2. The upper ends of these tongs are pivotally connected together with a bar 3 which serves as a spacer for the two pairs of lazy tongs and is provided with a hook 4 for suspending the device from a rail or other support, not shown.

The central pivotal connection of the lazy tongs is made with a central bar 5 which also acts as a spacer member.

Extending between the free ends of the legs 2 of one pair of lazy tongs and the corresponding legs of the other is a bar 6 provided on its inner side with projecting bosses 7 which support inwardly projecting prongs 8. As a means for preventing the spreading of the legs 2 beyond a predetermined point, the bar 3 is provided at each end with a freely floating washer 9 having lugs 10 which project longitudinally of the bar and over the connected upper ends of the lazy tongs.

In the modification shown in Figure 3, the bar 6 has secured to it a strip of metal 11, preferably by spot welding, which strip is provided with shoulders 12 defining spaces 13 therebetween, and from each shoulder a prong 8 projects.

In use the hanger is gripped by closing the hand around the upper and central bars 3 and 5 respectively, which causes the legs 2 and the bars 6 to spread apart, so that the end of the side of bacon may be placed therebetween, when on separating the bars 3 and 5 the bars 6 approach each other and the prongs 8 start to enter the bacon, as soon as this takes place the weight of the product exerting a downward pull on the bars 6 will cause the lazy tongs to elongate and force the prongs into the product to their full length, with the bosses 7, as in Figures 1 and 2, or the shoulders 12, as in Figure 3, in contact with the bacon. If the meat so hung is to be smoked, the smoke will be free to pass between the bosses, or as in Figure 3, through the spaces 13, so that very little area will be missed by the smoke and consequently a thorough smoking can be effected.

By virtue of the fact that the prongs are small and numerous, slight penetration is made of the meat and the hanger can be removed by simply drawing the bars 3 and 5 together as before described.

What we claim as our invention is:

A meat hanger comprising a lazy tong structure having suspension members at one end and pairs of legs at the other, a bar extending transversely of each of the legs and a plurality of prongs on each bar, the prongs of one bar projecting towards the other, said prongs being provided with means adapted to extend from its bar outwards to prevent the meat engaged by the prongs from forming contact with the bars.

JOHN HERBERT TAIT.
HUGH WILLIAM MacLEOD.